G. W. DUNHAM.
VALVE OPERATING MECHANISM.
APPLICATION FILED APR. 23, 1906.
923,422.
Patented June 1, 1909.
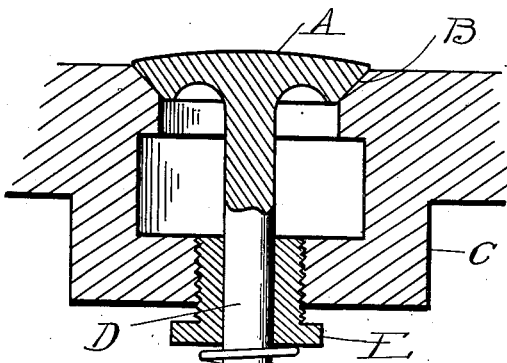
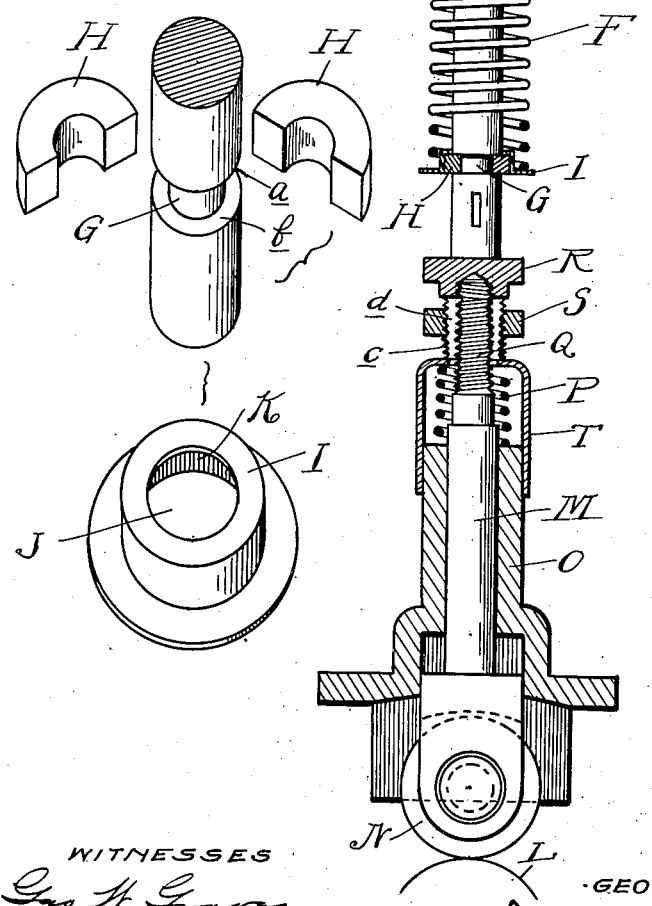
WITNESSES
INVENTOR
GEORGE W. DUNHAM.
BY
ATTYS.

UNITED STATES PATENT OFFICE.

GEORGE W. DUNHAM, OF LANSING, MICHIGAN, ASSIGNOR TO OLDS MOTOR WORKS, OF LANSING, MICHIGAN, A CORPORATION OF MICHIGAN.

VALVE-OPERATING MECHANISM.

No. 923,422.      Specification of Letters Patent.      Patented June 1, 1909.

Application filed April 23, 1906. Serial No. 313,215.

*To all whom it may concern:*

Be it known that I, GEORGE W. DUNHAM, a citizen of the United States of America, residing at Lansing, in the county of Ingham and State of Michigan, have invented certain new and useful Improvements in Valve-Operating Mechanism, of which the following is a specification, reference being had therein to the accompanying drawings.

The invention relates to valve-operating mechanism for explosion engines, and consists in the novel construction, arrangement and combination of parts as hereinafter set forth.

In the drawings, Figure 1 is a central longitudinal section through the valve and its operating stem; and Fig. 2 is a perspective view of the parts forming the spring abutment for the valve stem.

A is the valve and B is the valve seat therefor formed on the casing C.

D is a valve stem passing out through a gland E in the casing, and F is a spring sleeved upon this stem and acting to hold the valve normally to its seat.

One of the features of my invention is the means employed for forming the abutment for the spring upon the valve stem D, the construction being as follows:—

The valve stem is cut away at G, preferably by forming an annular gland therein, so as to form the opposed shoulders a b. H are segmental key members adapted for engagement with the recess G, and I is a collar apertured at J to slip over the valve stem, and having a socket K for receiving the key members H. With this construction, the parts may be assembled by, first, slipping the valve stem D through the gland E, then sleeving the spring F and the collar I thereon and pressing them upward beyond the recess G, after which the key members H may be engaged with the recess, and the collar I permitted to move outward to engage said key members with the recess J. When thus assembled, the tension of the spring F will hold the collar I constantly against the key members H, while the latter, being in the socket J, are prevented from disengaging with the recess G.

The valve is operated by a suitable cam L, driven by connections with the engine (not shown). This cam actuates the stem D through the medium of a rod M, the outer end of which is provided with an antifriction roll N for bearing against the cam, and the inner end normally in contact or close proximity to the end of the stem D. The rod M is guided in a suitable casing O secured to the main engine casing (not shown), the roll N engaging a slot in said casing O and serving to hold the rod from rotary movement. P is a spring sleeved upon the rod M outside of the casing O, acting to force said rod toward the stem D.

To prevent pounding and the consequent wear of parts, it is essential that the ends of the stem D and rod M should be either in contact or in very close proximity, and at the same time it is equally important that the valve A should be free to find its seat. I have therefore provided an adjustable portion on the end of the rod M, which may be moved toward or from the end of the valve stem, the construction being as follows:—

Q is a threaded portion at the end of the stem M. R is a member which is internally threaded to engage the threaded portion Q, and is externally provided with a tapering thread c. The threaded portion of this member is split at d, and S is a clamping nut externally engaging the tapering thread c. This construction permits of adjusting the member R longitudinally upon the stem M, so that its outer end may be arranged in the desired relation to the end of the valve stem D. After such an adjustment and by screwing up the nut S upon the tapering thread, the split portion of the member R may be firmly clamped upon the threaded portion Q of the stem, so as to prevent change in position. The member R further acts as an abutment upon the stem M for the spring P and, to protect said spring, a shield or hood T is sleeved on the stem between the spring and member R, and telescopically engages the end of the casing O, thereby forming a housing for the spring.

What I claim as my invention is:—

1. In a valve operating device, the combination with a valve stem and a spring sleeved thereon, of a bearing for said spring upon said stem comprising a two-part key member engaging a recess in said stem and projecting outward therefrom, and a collar apertured to fit over said stem comprising an annular longitudinally extending body portion engaging the sides of said key member, an annular flange projecting outwardly from one end of said body portion, and forming a seat for said spring, and an inwardly extending annular flange on the other end of said body portion engaging the top of said key member.

2. In a valve-operating device the combination with a valve stem and a spring sleeved thereon, of a bearing for said spring upon said stem comprising a key member engaging a recess in said stem and projecting outward therefrom, a collar apertured to longitudinally engage said stem and having a socket portion embracing said key member formed by an inwardly projecting annular flange upon the upper portion of said collar, and an outwardly projecting annular flange upon the lower portion of said collar forming a seat for said spring, the sides of said collar serving as a bearing for the spring to hold the same from lateral movement.

In testimony whereof I affix my signature in presence of two witnesses.

GEORGE W. DUNHAM.

Witnesses:
CHAS. D. HASTINGS,
ARTHUR MITCHELL.